United States Patent [19]
Falcone et al.

[11] Patent Number: 5,432,919
[45] Date of Patent: Jul. 11, 1995

[54] SEQUENTIAL REFERENCE MANAGEMENT FOR CACHE MEMORIES

[75] Inventors: Joseph R. Falcone, Auburndale; James S. Love, Milford, both of Mass.; Bradley G. Wherry, Denver, Colo.

[73] Assignee: Digital Equipment Corporation, Maynard, Mass.

[21] Appl. No.: 997,493

[22] Filed: Dec. 28, 1992

Related U.S. Application Data

[63] Continuation-in-part of Ser. No. 376,305, Jul. 6, 1989, abandoned.

[51] Int. Cl.6 .............................................. G06F 12/12
[52] U.S. Cl. .............................. 395/425; 364/DIG. 1
[58] Field of Search ... 364/200 MS File, 900 MS File; 395/400 MS File, 425 MS File

[56] References Cited

FOREIGN PATENT DOCUMENTS 60-214060 10/1985 Japan.
64-26254 1/1989 Japan.

OTHER PUBLICATIONS

IBM Technical Disclosure Bulleting, vol. 26, No. 8 Jan. 1984, p. 4283; Armonk, N.Y. J. H. Pomerene, et al.; "Multiple Directories for A Second Level of Storage".

Primary Examiner—Reba I. Elmore
Attorney, Agent, or Firm—Arnold, White & Durkee

[57] ABSTRACT

A cache memory is divided into at least two collections of data which effectively provide higher and lower priority regions for retaining data within the cache. The cache is arranged to divide its stored data into a high-priority (protected) collection of data and a low-priority (probationary) collection of data. Each collection of data is organized as a list, with a most recently used (MRU) end and a least recently used (LRU) end. Data accessed from either of the collections is added to the MRU end of the protected collection, having been removed from its previous place in either of the lists of collections. Data in any of the collections which is least recently used is removed from that collection as space is needed for other data. Newly acquired data, such as retrieved from or written to a mass storage device such as a disk drive is added to the MRU end of the probationary collection. Data which is removed from the protected collection is also added to the MRU end of the probationary collection. In this way, data retrieved from the probationary collection is promoted to the protected collection and if room is needed in the protected collection, then the least recently used data from the protected collection is removed and added (demoted) to the MRU section of the probationary collection to provide a "last chance" for data reuse.

14 Claims, 16 Drawing Sheets

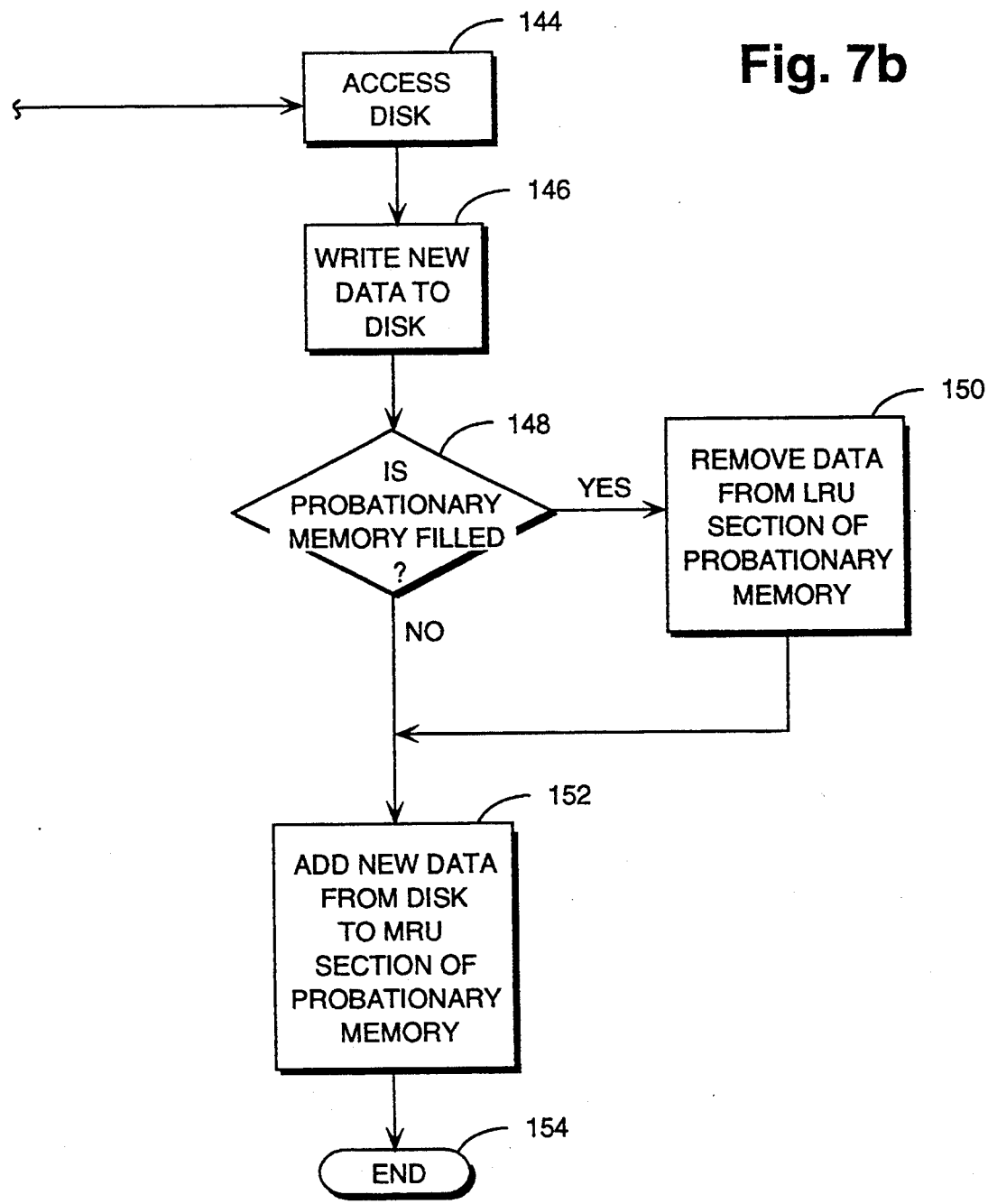

SEQUENTIAL REFERENCE MANAGEMENT FOR CACHE MEMORIES

RELATED APPLICATION

This application is a continuation-in-part of application Ser. No. 07/376,305 filed Jul. 6, 1989 by Joseph R. Falcone, James Spencer Love and Bradley Gill Wherry and titled Sequential Reference Management for Cache Memories.

FIELD OF THE INVENTION

The present invention relates to data sorting methodology and apparatus for cache memory management, and more particularly to data replacement methodology and apparatus for mass storage devices (MSD's) which comprise a cache for storing portions of data retrieved from the MSD.

BACKGROUND OF THE INVENTION

Random-access MSD's, such as optical or magnetic disk drives, and other storage and file subsystems characterized by slow data access times, frequently have at least one associated cache which stores portions of data retrieved from the storage systems. The slow access times, which may be in the range of 500 microseconds to 500 milliseconds, allow the cache to enhance the performance of the MSD for applications which require that the data retrieved from the MSD be frequently re-used. The cache stores the frequently used data so that the MSD does not have to repeatedly retrieve it from the storage system using time consuming techniques.

The data which is retrieved from the MSD and stored in a cache is generally data which is requested by one or more processes. The processes may have request referencing patterns which let the cache enhance the performance of the MSD, or the processes may have referencing patterns which prevent the cache from benefitting the storage system at all. In practice, those processes which have referencing patterns which do not permit effective cache utilization tend to degrade the performance of the cache for other processes.

The performance of a cache is measured by the percentage of the total requests that can be satisfied by the cache. The use of a cache eliminates the slow mechanical operations associated with re-acquiring or repeatedly retrieving the requested data from the storage system. Process referencing patterns allow the cache to perform well if the process repeatedly requests data from the same MSD locations so that the data is found in the cache on subsequent references. The cache performs poorly if the processes request data from distinct MSD locations only once or infrequently.

If a cache has a storage capacity which is smaller than a sequence of references to distinct data items requested by a process, all of the previous contents of the cache can be pushed out of the cache. Furthermore, this flooding effect reduces the effectiveness of the cache for other processes whenever long sequential references occur which replace a substantial fraction of the cache storage capacity.

One example of such a long sequential reference to an MSD such as a magnetic disk drive is a disk backup, which effectively makes one long sequential reference to the entire disk. A conventional cache will be flooded by this useless data. Typically this problem is solved by modifying the backup process to bypass the cache. However, only the worst and most predictably pathological processes can be dealt with in this way. Therefore, it would be desirable to compensate for long sequential references without requiring that they be identified in advance or that pathological processes be modified.

The least recently used (LRU), least frequently used (LFU), and first-in, first-out (FIFO) replacement algorithms have been used to sort data in the cache to enhance its performance with process request referencing patterns. The LRU replacement algorithm works by organizing the data in the cache in a list of data blocks which is sorted according to the length of time since the most recent reference to each data block. The most recently used (MRU) data is at one end of the list, while the least recently used (LRU) data is at the other. New data is added to the MRU end of the list. When data is to be discarded by the cache for accommodating the receipt of new data, the discarded data comes from the LRU end of the list. However, the LRU algorithm does not eliminate the long sequential reference problem.

The LFU replacement algorithm works by sorting the data in the cache according to the number of times that it has been used. The LFU algorithm organizes the cache data in a list, with the most frequently used (MFU) data at one end of the list while the least frequently used (LFU) data is at the other. New data which has only been used once is added to the LFU end of the list. Although the LFU algorithm is immune to the long sequential reference problem, it has other drawbacks. With the pure LFU algorithm, there is no way for data which was once heavily used to leave the cache when it is no longer needed. The overhead of computing the LFU order is higher than LRU. When an aging scheme is implemented to remove old data from the cache using the LFU algorithm, the overhead is much higher than with the LRU replacement algorithm.

The first-in, first-out (FIFO) replacement algorithm is the simplest, sorting the data in the order of the first reference that missed, falling to find the data in the cache. The FIFO algorithm organizes the cache data in a list, with the most recently missed (MRM) data at one end of the list (MRU), and the least recently missed (LRM) data at the other (LRU). When data is to be discarded by the cache for accommodating the receipt of new data, the discarded data comes from the LRM end of the list. FIFO works well when data is likely to be used several times close together in time, however, it does not serve to distinguish data that might be worth keeping for a longer time. Furthermore, the FIFO algorithm is most susceptible to the long sequential reference problem, since the higher the rate of data passing through the cache, the shorter the time available for its reuse.

DESCRIPTION OF THE DRAWINGS

FIGS. 7a and 7b are flow charts illustrating the cache management process for a write request and using a write-through cache.

Figure 1:
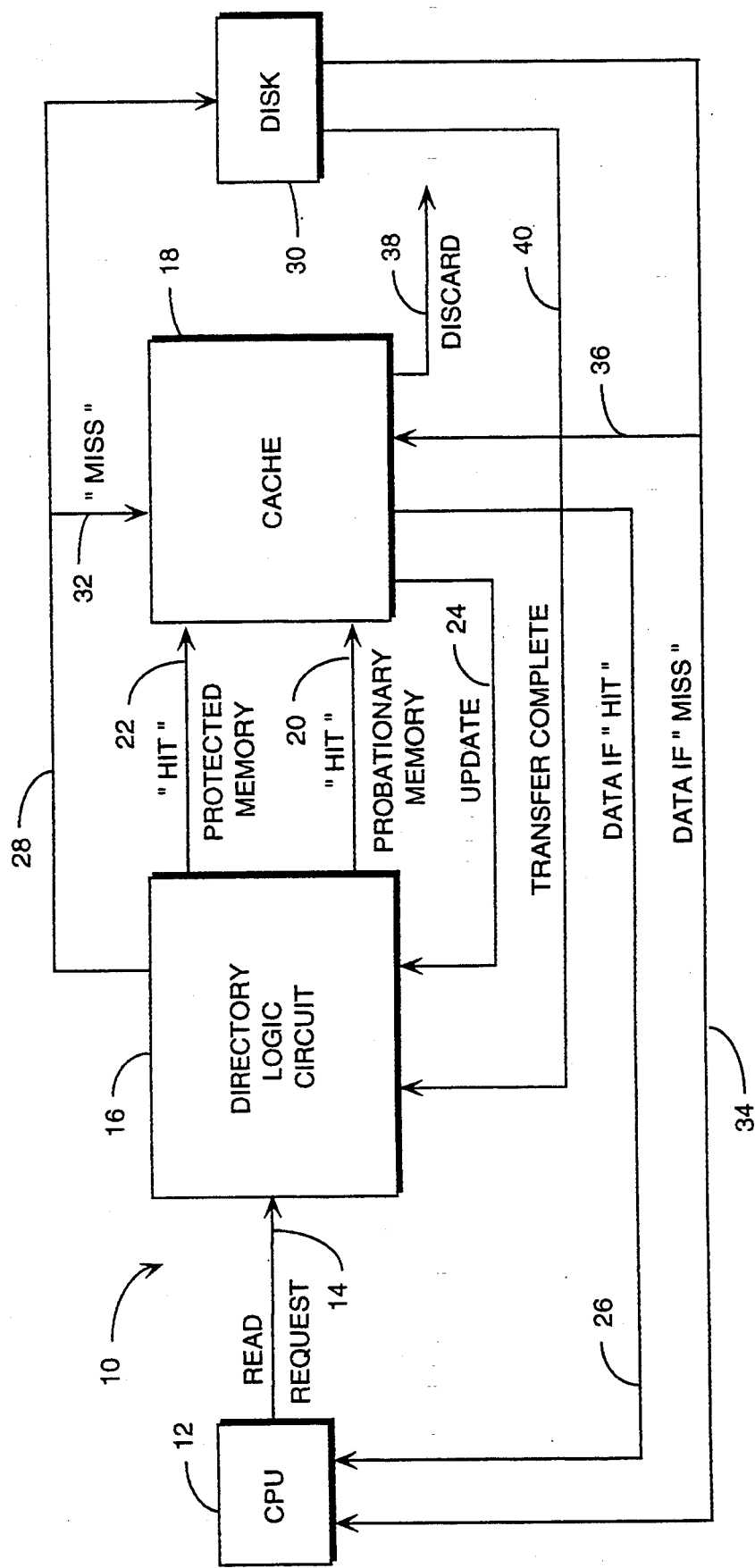
FIG. 1 is a block diagram of a data storage system processing a read request and using the cache management process of the present invention.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the applicant's intention is to cover all modifications, equivalents, and alternatives falling within the spirit and scope of the invention as defined by the appended claims.

SUMMARY OF THE INVENTION

The present invention comprises methodology and apparatus for partitioning the data in a cache into at least two collections of data and which provides a management process for the promotion of the data between the collections. Each collection can use a replacement algorithm such as LRU.

In its most basic form, the cache is arranged to divide its stored data into a high-priority or protected LRU collection of data and a low-priority or probationary FIFO collection of data. Each collection of data is organized as a list, with a most recently used (MRU) end of the list, and a least recently used (LRU) end of the list. Data retrieved from either of the collections by one of the processes is added to the MRU end of the high priority or protected collection, having been removed from its previous place in either of the lists of collections. Data in any of the collections which is least recently used is removed from that collection, as space is needed for other data. Newly acquired data, such as retrieved from or written to the MSD is added to the MRU end of the probationary list or collection. Data which is removed from the protected collection is also added to the MRU end of the probationary collection. In this way, data retrieved from the probationary collection by the processes is promoted to the protected collection and if room is needed in the protected collection, then the least recently used data from the protected collection is removed and added (demoted) to the MRU section of the probationary collection to provide a "last chance" for data reuse. The operation of the cache is an improvement on the LRU algorithm since it approximates the operation of the LFU algorithm with an aging scheme without the drawbacks of the LFU algorithm described above. The approximation becomes closer as the number of collections is increased. However, the cost of the cache algorithm also increases with the number of collections. In addition, different promotion policies may be applied to the transfer of data from a probationary region or portion of the cache to a protected region or portion of the cache.

DESCRIPTION OF THE PREFERRED EMBODIMENT

Referring to the drawings, wherein like reference characters designate like or corresponding parts throughout the views, FIG. 1 is a block diagram of a data storage system 10 processing a read request and using the cache management process of the present invention. A central processing unit (CPU) 12 initiates a read request over line 14. A directory logic circuit 16 receives the read request from the CPU 12 and determines if the data sought is located in the cache 18. The cache 18 is arranged to divide its stored data into a high priority or protected LRU collection of data and a low priority or probationary FIFO collection of data. The operation of cache 18 is described in detail hereinafter with reference to FIG. 4. If the sought or targeted data is stored in the probationary portion of the cache 18, a "hit" signal is sent over line 20. If the sought or targeted data is stored in the protected portion of the cache 18, a "hit" signal is sent over line 22. The location of the data in the cache 18 is updated over line 24 from the cache 18 to the directory logic circuit 16. If the target data is located in the cache 18, the target data is sent to the CPU 12 over line 26. If the data sought by the read request is not located in the cache 18, a request for the data is sent over line 28 to the disk backing store 30 and a "miss" signal is sent to the cache 18 over line 32. The disk 30 sends the sought or targeted data over line 34 to the CPU 12 and, over line 36, the cache 18. The cache 18 discards LRU data over line 38, if necessary, to make room for the new data from the disk 30. In addition, the disk 30 advises the directory logic unit 16 that the transfer of data to the cache 18 is complete by sending a signal over line 40. The operation and structure of the CPU 12, the directory logic unit 16 and the disk backing store 30 are well known to those of ordinary skill in the field and, accordingly, are not described herein. The present invention is directed to the cache 18 and the management process of storing data in the cache 18.

Figure 2:
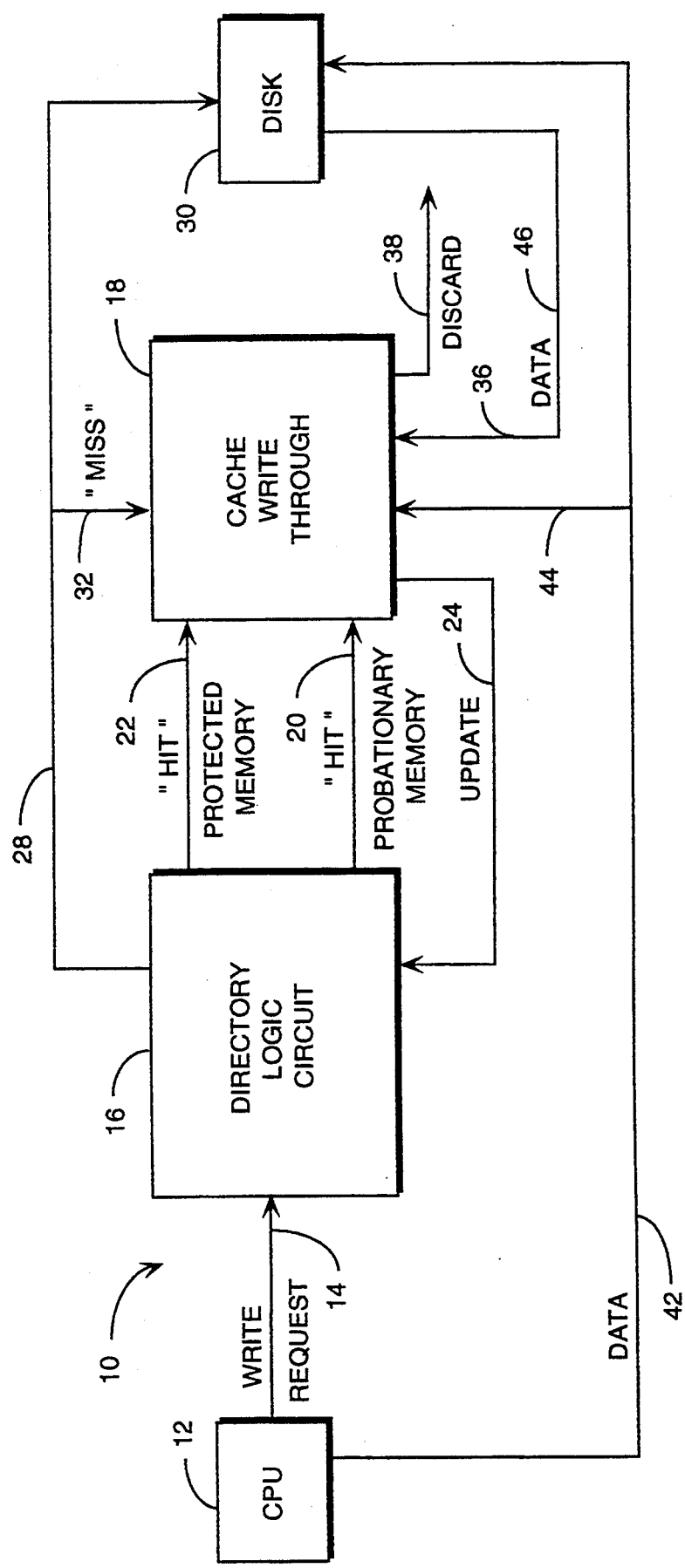
FIG. 2 is a block diagram of a data storage system processing a write request and using the cache management process of the present invention with a write-through cache.

FIG. 2 is a block diagram of a data storage system 10 processing a write request and using the cache management process of the present invention with a write-through cache 18. The CPU 12 initiates a write request over line 14 to the directory logic circuit 16. The data to be written is sent from the CPU 12 to the disk 30 over line 42 and to the cache 18 over line 44. If the data to be written over or replaced is in the probationary portion of the cache 18, the directory logic circuit 16 sends a "hit" signal over line 20 to cache 18. If the data to be written over or replaced is in the protected portion of the cache 18, the directory logic circuit 16 sends a "hit" signal over line 22 to the cache 18. The data is then written to both the cache 18 and disk 30. If the directory logic circuit 16 determines that the data to be written over is not in cache 18, a signal with the data address is sent to disk 30 over line 28 and a "miss" signal is sent to cache 18 over line 32. The data on line 42 is now written on disk 30. The data written on disk 30 is then placed on line 46 and sent to the cache 18 over line 36 to be added at the MRU section of the probationary portion of cache 18. Data previously stored in cache 18 is discarded on line 38, if necessary, to make room for the new data. The location of the data in the cache 18 is updated over line 24 from the cache 18 to the directory logic circuit 16. The operation of the cache is described in detail hereinafter, in particular with reference to FIG. 4.

Figure 3:
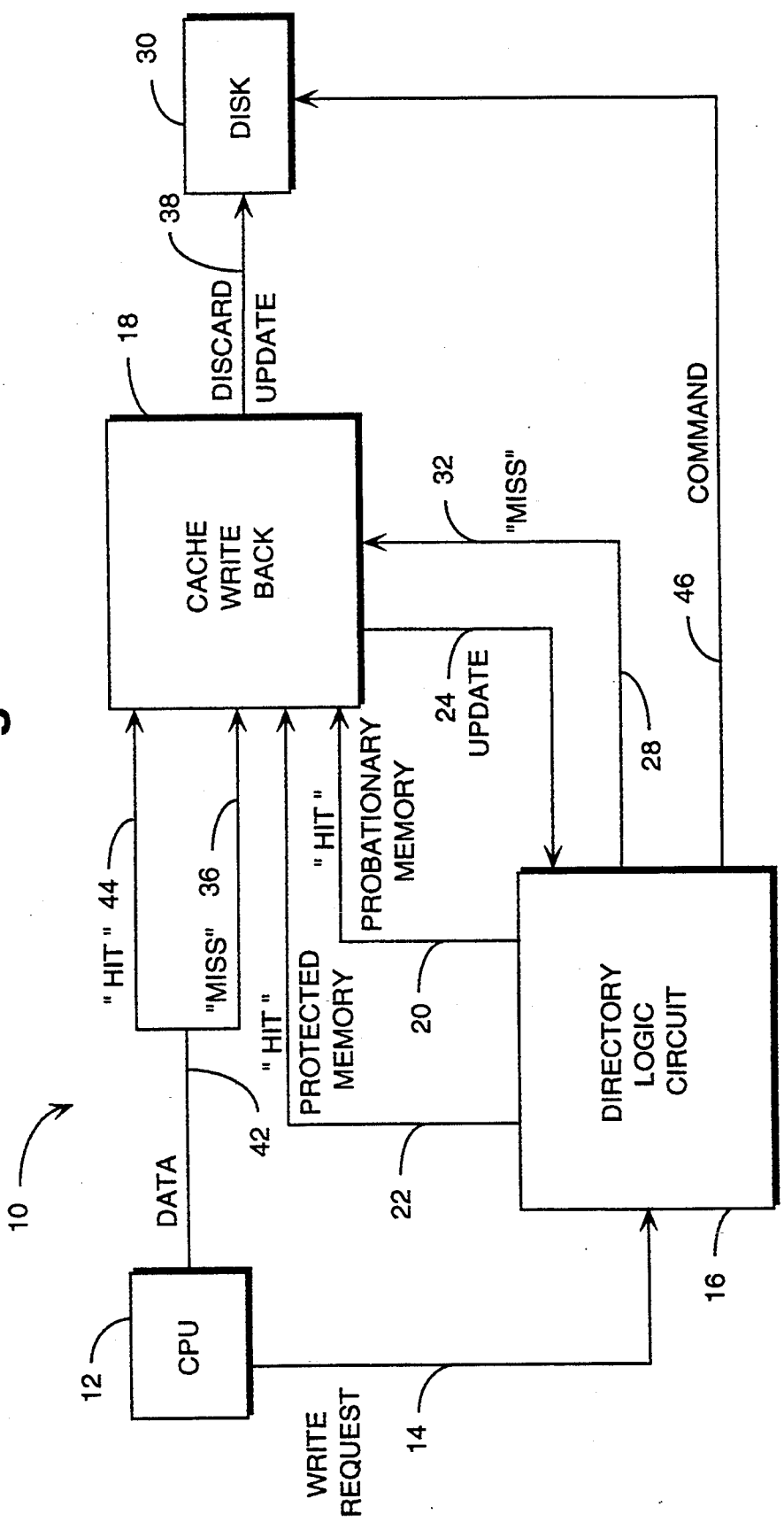
FIG. 3 is a block diagram of a data storage system processing a write request and using the cache management process of the present invention with a write-back cache.

FIG. 3 is a block diagram of a data storage system 10 processing a write request and using the cache management process of the present invention with a write-back cache 18. The CPU 12 sends a write request over line 14 to the directory logic circuit 16 and the data to be written on line 42 connected to lines 36 and 44 to the cache 18. The write data is inputed to the cache 18 on line 36 if there is a "miss" which is signaled from the directory logic circuit 16 on line 28 and sent to the cache 18 on line 32 or is inputed to the cache 18 on line 44 if there is a "hit" which is signaled on either line 20 or 22 from directory logic circuit 16. At a latter point in time, the data written to cache 18 is written on disk 30. A command update signal is sent from directory logic circuit 16 on line 46 to disk 30 to advise that a write will be coming from cache 18. In the present embodiment, the write to the disk 30 is over discard line 38. Of course, a separate write to disk line from cache 18 to disk 30 could be provided. The location of the data in the cache 18 is updated over line 24 from the cache 18 to the directory logic circuit 16. The operation of the cache is described in detail hereinafter, in particular with reference to FIG. 4.

Figure 4:
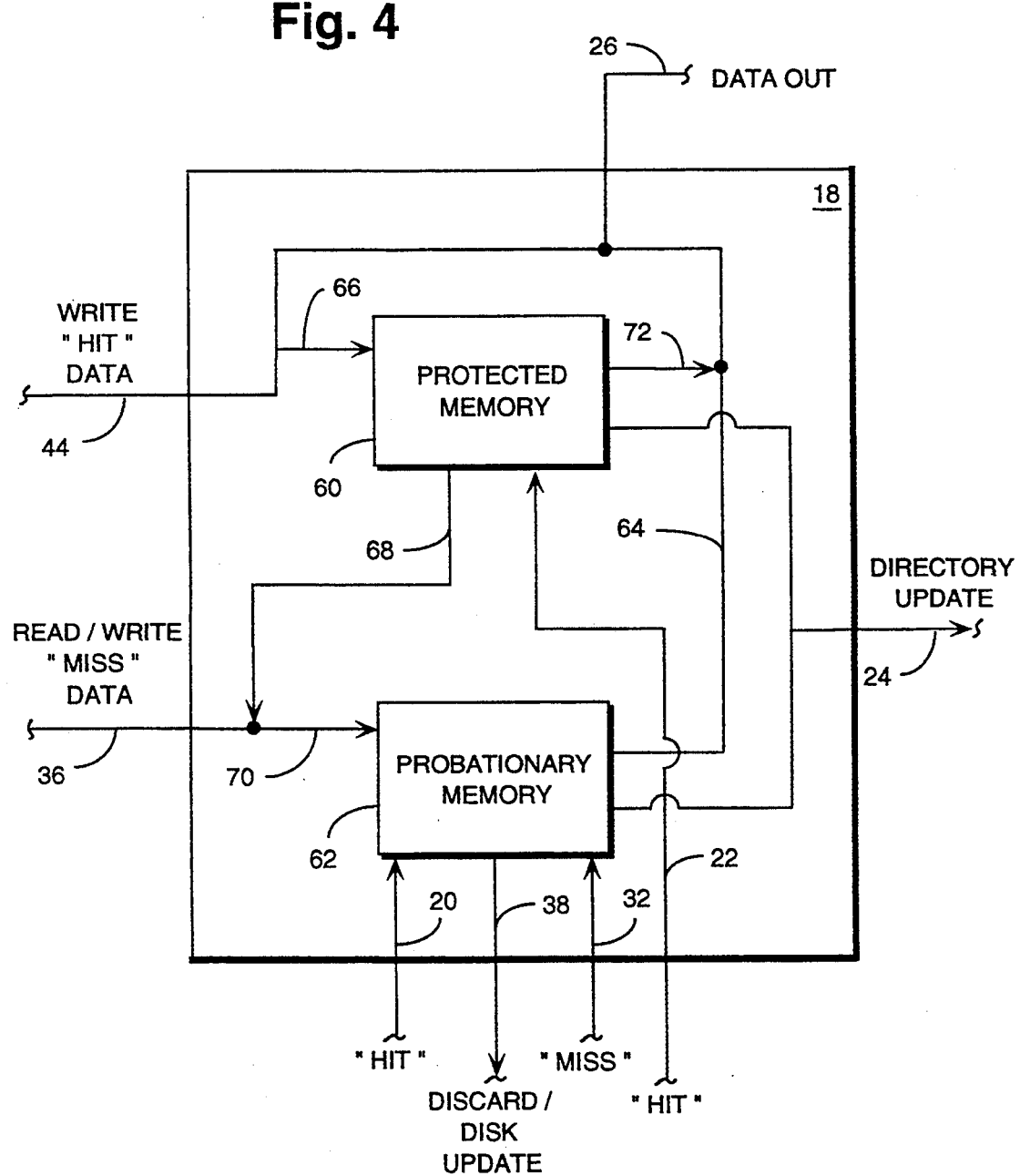
FIG. 4 is a block diagram of the cache used in the storage system of FIGS. 1–3.

FIG. 4 is a block diagram of the cache structure of the preferred embodiment of the invention using two collections of data. However, it is within the scope of the present invention to use more than two collections of data, if desired. In this regard, refer to FIGS. 9 and 10 described in more detail hereinafter. The cache 18 for a MSD or disk 30 comprises two memory portions or regions, a high priority or protected memory region 60 and a low priority or probationary memory region 62. The protected region 60 sorts stored data blocks according to an LRU replacement algorithm and the probationary region 62 sorts stored data blocks according to a FIFO replacement algorithm. Each collection of data, probationary memory 62 and protected memory 60, has a most recently used (MRU) section and a least recently used (LRU) section. In general, the cache 18 stores the frequently used data so that the mass storage device (MSD) or disk 30 does not have to repeatedly retrieve the data from storage using time consuming techniques. Thus, the data which is retrieved from the disk 30 and stored in the cache 18 is generally data which is requested by one or more processes running on the CPU 12. For a read operation the directory logic circuit 16 determines if the target data is located in the cache 18. If the target data is located in the probationary memory 62, a "hit" signal is sent over line 20 to the cache 18. The target data from the probationary memory 62 is removed via line 64 and placed in the MRU section of the protected memory 60 via line 66. The target data is also sent to the requesting CPU 12 via output line 26. If the protected memory 60 is full, the LRU data is removed from the protected memory on line 68 to make room for the target data on line 66 from the probationary memory 62. The LRU data removed from the protected memory 60 is added to the MRU section of the probationary memory 62 via line 70. An update signal from the probationary memory 62 and the protected memory 60 is sent via line 24 to the directory logic circuit 16 so that the location of the data in cache 18 is updated.

If the target data is located in the protected memory 60, a "hit" signal is sent over line 22 to the cache 18. The target data from the protected memory 60 is removed via line 72 and placed in the MRU section of the protected memory 60 via lines 64 and 66. Since the target data is from the protected memory 60 the amount of data in the protected memory 60 does not change and, accordingly, there is no removal of data on line 68. The target data from the protected memory 60 is also sent to the requesting CPU 12 via output line 26. Of course, an update signal from the protected memory 60 is sent via line 24 to the directory logic circuit 16 so that the location of the data in cache 18 is updated.

If the target data is not located in the cache 18, a signal is sent over line 28 to the disk 30 and a "miss" signal is sent over line 32 to the probationary memory 62 of cache 18. The target data is now retrieved from the disk 30 and sent to both the requesting CPU 12 via line 34 and to the cache 18 via line 36. The read data from the disk 30 is added to the MRU section of the probationary memory 62 via line 70. If the probationary memory 62 is full, the LRU data is removed from the probationary memory 62 via line 38 to make room for the read data on line 70. Of course, an update signal is sent via line 24 to the directory logic circuit 16 so that the location of data in the probationary memory 62 is updated.

Consequently, for the preferred embodiment, data selected from either the protected memory 60 or the probationary memory 62 re-sorts the data in the protected memory 60 to make the selected data the most recently used of the data in the protected memory 60. Likewise, both new data from the disk 30 and removed data from the protected memory 60 re-sort the data in the probationary memory 62 to make the new data from the disk 30 on line 36 or the removed data from the protected memory 60 on the line 68 the most recently used of the data in the probationary memory 62.

In the event that a string of new data from the disk 30 on line 36 fills up the probationary memory 62, least recently used data is removed and discarded on the line 38. However, the protected memory 60 is not affected by the loading of new data into the probationary memory 62 except to the extent that data is selected from the new data in the probationary memory 62 and then loaded into the protected memory 60 in response to a process request from the CPU 12. The data sorted in the protected memory 60 is resistant to long sequential references received by the cache 18 on the line 36 since it has higher priority than the data fed to the probationary memory 62. This is because both the removed data on the line 68 from the protected memory 60 and the new data from disk 30 on the line 36 are added to the probationary memory 62 while the protected memory 60 is only loaded with process requested data retrieved from either the probationary memory 62 or itself.

The effect of the cache 18 described above is to retain data which has been requested more than once much longer than data which has been used only once. This is because any data selected from either the protected memory 60 or the probationary memory 62 is fed to the most recently used input of the protected memory 60. This data then must pass through both the protected memory 60 and the probationary memory 62 before it is discarded via the line 38. However, data which is requested only once is retained only for as long as it remains in the probationary memory 62. That is, the data loaded into the probationary memory 62 passes through the probationary memory 62 and is discarded on the line 38 if it is not again selected prior to being discarded.

Of course, the protected memory 60 and the probationary memory 62 can be part of the same memory. If one memory is used, the data need not be physically moved when it logically moves within or between the protected memory 60 and the probationary memory 62, as will be understood by someone of ordinary skill in the art. For example, a single LRU algorithm may comprise the protected memory 60 and the probationary memory 62 and new data from the disk 30 is inserted into the middle of the single LRU algorithm with a "cursor" which points into the middle of the sorted data in the algorithm. The cursor must be updated whenever the single algorithm is updated. However, for the sake of clarity, the embodiments of the invention are described as separate memories with data moving within and between the memories.

The present invention may use a fixed ratio of memory between the protected region 60 and the probationary region 62, such as half and half, or it can be dynamically controlled to change the proportions of memory according to different conditions. For instance, the length of time that data is in the protected region 60 and the probationary region 62 can determine their relative sizes. The probationary region 62 can shrink as long as a minimum time for possible promotion of its sorted data to the protected region 60 is maintained. The protected region 60 can shrink if the length of time since the second selection of data from the protected region 60 is extremely long. In addition, different promotion schemes can be used to move the data from the probationary region 62 to the protected region 60 without departing from the principles of the present invention. For example, another useful promotion policy is to detect when two sequential operations to a single data block are both reads. With respect to that single data block, the operations are consecutive, but with respect to all the data in the cache the operations need not be consecutive. If the data is read twice without an intervening write operation, it is promoted to the protected region or portion of the cache. However, if reads and writes alternate, then the data is only moved to the MRU end of the collection, probationary or protected, in which it was found. In this case, both of the collections are managed using LRU algorithms, and neither using FIFO. In addition, other variations are possible, such as promoting only on the second hit (third reference) or promoting data to different protected collections depending on whether it is read or written. Selection of these promotion policies is best done using an analysis of the behavior of the processes, which may be done dynamically as the cache is actually used.

The cache management 5process also operates with write commands from the CPU 12 with the cache 18 operated either as a write-through or write-back cache. The number of collections can be increased beyond two using the same approach of retaining data that is retrieved at least twice for a longer period of time than data retrieved only once. Thus, the cache management process approximates the operation of the LFU algorithm, without the drawbacks of the LFU algorithm.

For a write operation with the cache 18 functioning as a write-through cache, the directory logic circuit 16 determines if the data to be written over or replaced is located within the cache 18. If the data to be replaced is in the probationary memory 62, a "hit" signal is sent to cache 18 via line 20 and the old data is erased in any manner as is well known to one of ordinary skill in the field. The new data from directory logic circuit 16 is sent via line 44 to the protected memory 60 via line 66. If the protected memory 60 is not full the new data is added at the MRU section of the protected memory 60. If the protected memory 60 is full, then before the new data is added to the MRU section, LRU data is removed via line 68 and added to the MRU section of the probationary memory 62 via line 70. The probationary memory 62 cannot be full since the old data has just been erased. An update signal is sent via line 24 to the directory logic circuit 16 so that the location of data in the cache is updated.

If the data to be replaced is in the protected memory 60, a "hit" signal is sent to cache 18 via line 22 and the old data erased. The new data from directory logic circuit 16 is sent via line 44 to the protected memory 60 via line 66 and added to the MRU section of the protected memory 60. An update signal is sent via line 24 to the directory logic circuit 16 so that the location of data in the protected memory 60 is updated.

If the data to be replaced is not located in the cache 18, a "miss" signal is sent to cache 18 via line 32. The new data is written to the disk 30 and then sent from disk 30 to the cache 18 via line 36. The read data from disk 30 is added to the MRU section of the probationary memory 62. Before the read data from the disk 30 is added to the probationary memory 62, if the memory is full, LRU data from the probationary memory 62 is discarded via line 38. An update signal is sent via line 24 to the directory logic circuit 16 so that: the location of data in the probationary memory 62 is updated.

For a write operation with the cache 18 functioning as a write-back cache, the directory logic circuit 16 determines if the data to be written over or replaced is located within the cache 18. If the data to be replaced is in the probationary memory 62, a "hit" signal is sent to cache 18 via line 20 and the old data is erased. The new data from directory logic circuit 16 is sent via line 44 to the protected memory 60 via line 66. If the protected memory 60 is not full, the new data is added to the MRU section of the protected memory 60. If the protected memory 60 is full, then before the new data is added to the MRU section, LRU data is removed via line 68 and added to the MRU section of the probationary memory 62. The probationary memory 62 cannot be full since the old data has just been erased. An update signal is sent via line 24 to the directory logic circuit 16 so that the location of data in the cache 18 is updated.

If the data to be replaced is in the protected memory 60, a "hit" signal is sent to cache 18 via line 22 and the old data is erased. The new data from the directory logic circuit 16 is sent via line 44 to the protected memory 60 via line 66 and added to the MRU section of the protected memory 60. An update signal is sent via line 24 to the directory logic circuit 16 so that the location of data in the protected memory is updated.

If the data to be replaced is not located in the cache 18, a "miss" signal is sent to cache 18 via line 32. The new data is written to cache 18 via line 36. The new data is added to the MRU section of the probationary memory 62 via line 70. If the probationary memory 62 is full, then before the new data is added LRU data from probationary memory 62 is discarded via line 38. The data discarded via line 38 is sent to disk 30 together with the command signal from the directory logic circuit 16 via line 46 to update disk 30. An update signal is sent via line 24 to the directory logic circuit 16 so that the location of data in the probationary memory 62 is updated.

Figure 5A:
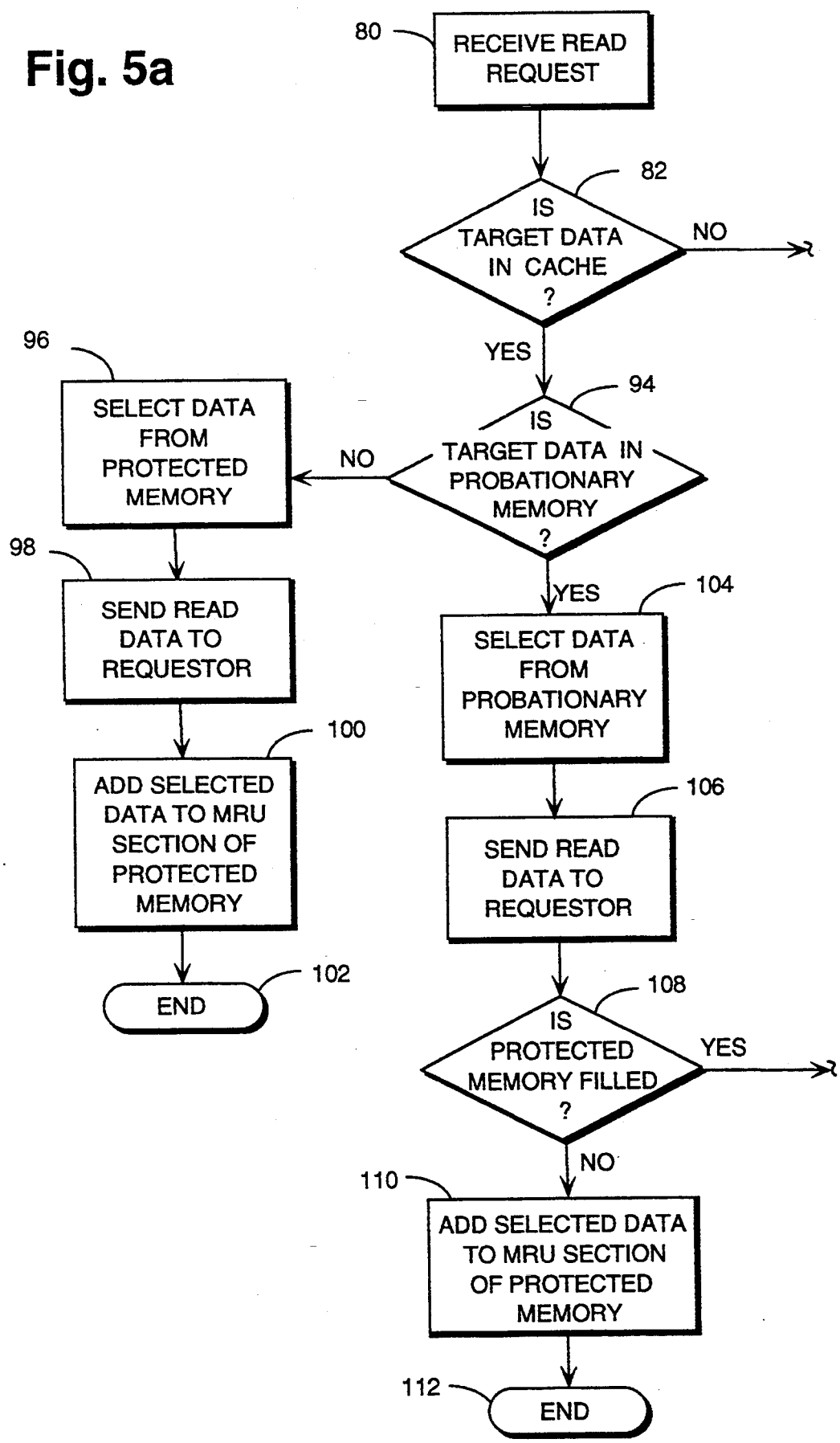
FIGS. 5a and 5b are flow charts illustrating the cache management process for a read requested using a write-through cache.
Figure 5B:
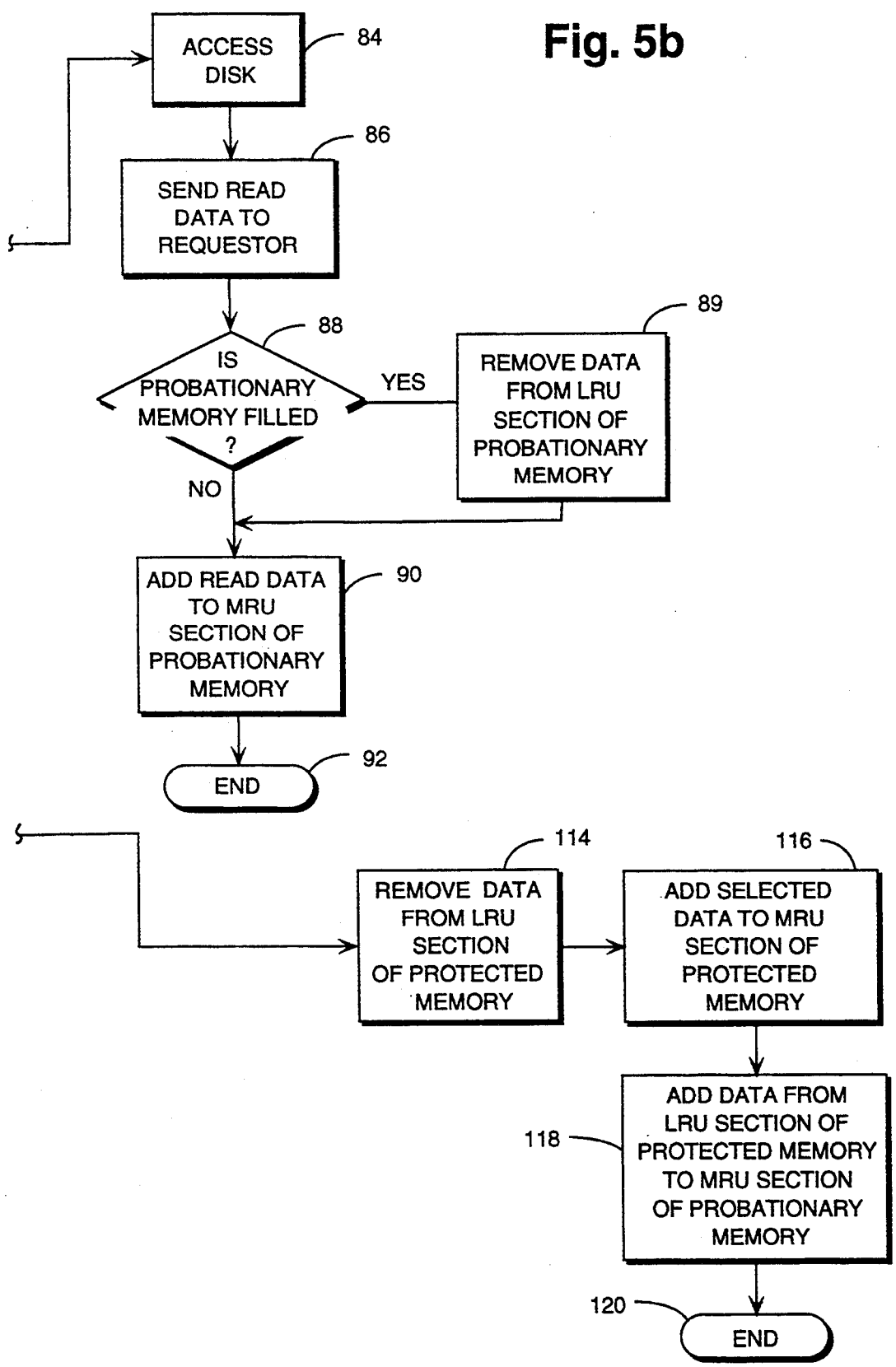

FIGS. 5a and 5b are flow charts illustrating the operation of the present invention processing a read request and using a write through cache. A read I/O request is received at step 80. If the data targeted is not in the cache as determined at step 82, the mass storage device, e.g. disk, is accessed at step 84. The target data is read from the disk and sent to the requestor at step 86. Next at step 88 the status of the low priority or probationary memory is determined. If the low priority or probationary memory is not filled, then the data read from the disk is stored in the MRU (most recently used) section of the probationary memory at step 90 and the process ends at step 92. If the probationary memory is filled as determined at step 88, then data is removed from the least recently used (LRU) section of the probationary memory at step 89. Next, the read data from the disk is stored in the MRU section of the probationary memory at step 90 and the process ends at step 92. Each time data is removed from the probationary memory or moved between or within the probationary and protected memories an update signal is sent over line 24 to the directory logic circuit 16. Since this always occurs for the sake of clarity, it is not separately shown in any of the flow charts of FIGS. 5-8 and FIG. 11.

If the data sought is in the cache as determined at step 82, then the location of the target data is determined at step 94. If the target data is in the protected or high priority memory, then the target data is read at step 96 and sent to the requestor at step 98. Next, the data read from the protected memory is stored in the MRU section of the protected memory at step 100 and the process ends at step 102. If the target data is located in the probationary memory, the target data is read at step 104 and sent to the requestor at step 106. If the protected memory is not filled as determined at step 108, then the selected data is stored in the MRU section of the protected memory at step 110 and the process ends at step 112. If the protected memory is filled as determined at step 108, then data is removed from the LRU section of the protected memory at step 114. Next, the selected data is stored in the MRU section of the protected memory at step 116 and the removed data from the LRU of the protected memory is stored in the MRU section of the probationary memory at step 118 and the process ends at step 120.

Figure 6A:
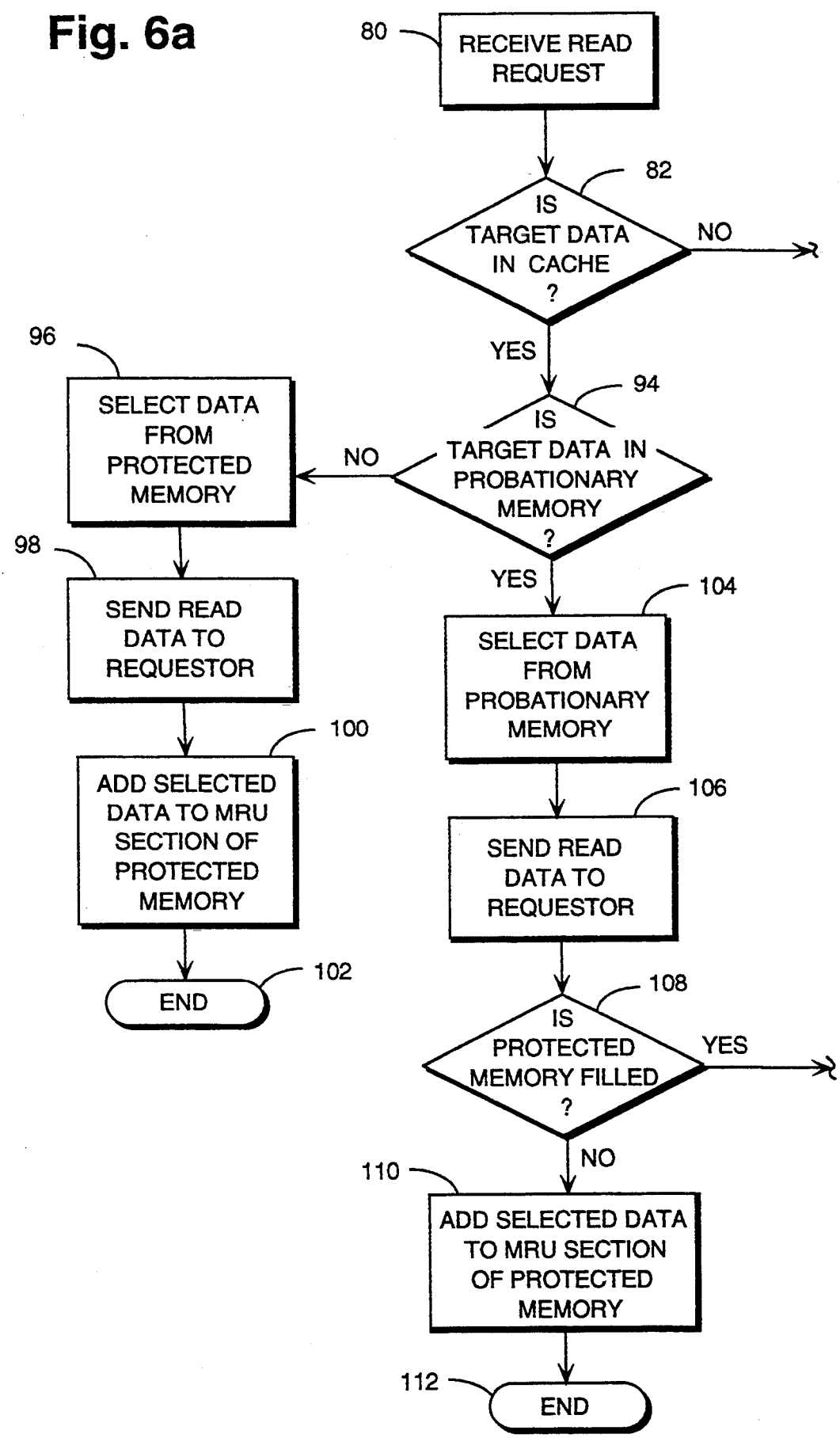
FIGS. 6a and 6b are flow charts illustrating the cache management process for a read request and-using a write-back cache.
Figure 6B:
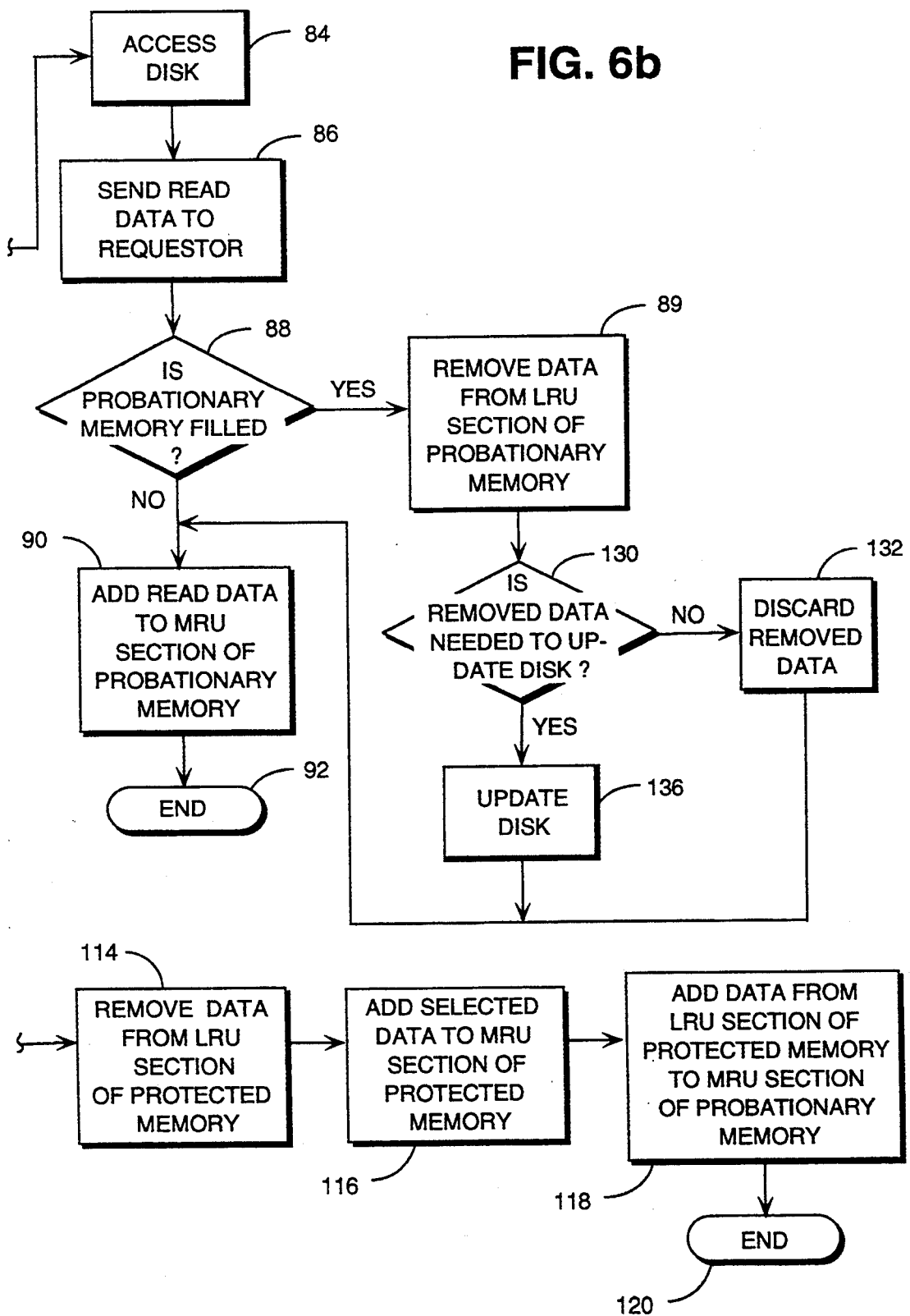

FIGS. 6a and 6b are flow charts illustrating a read operation with a write-back cache. The operation is the same as described for a write-through cache and, accordingly, is not again described except if the low priority memory or probationary memory is not filed, then data read from the disk is added to the MRU section of the probationary memory at step 90 and the process ends at step 92, but if the low priority or probationary memory is filled at step 88, data is removed from the LRU section of the probationary memory at step 89 then at step 130 it is determined if the removed data is needed to update the disk. If the removed data is not needed to update the disk the removed data is discarded at step 132 and the process proceeds to step 90. If the removed data is needed to update the disk the removed data is sent to the disk at step 136 and the process proceeds to step 90.

Figure 7A:
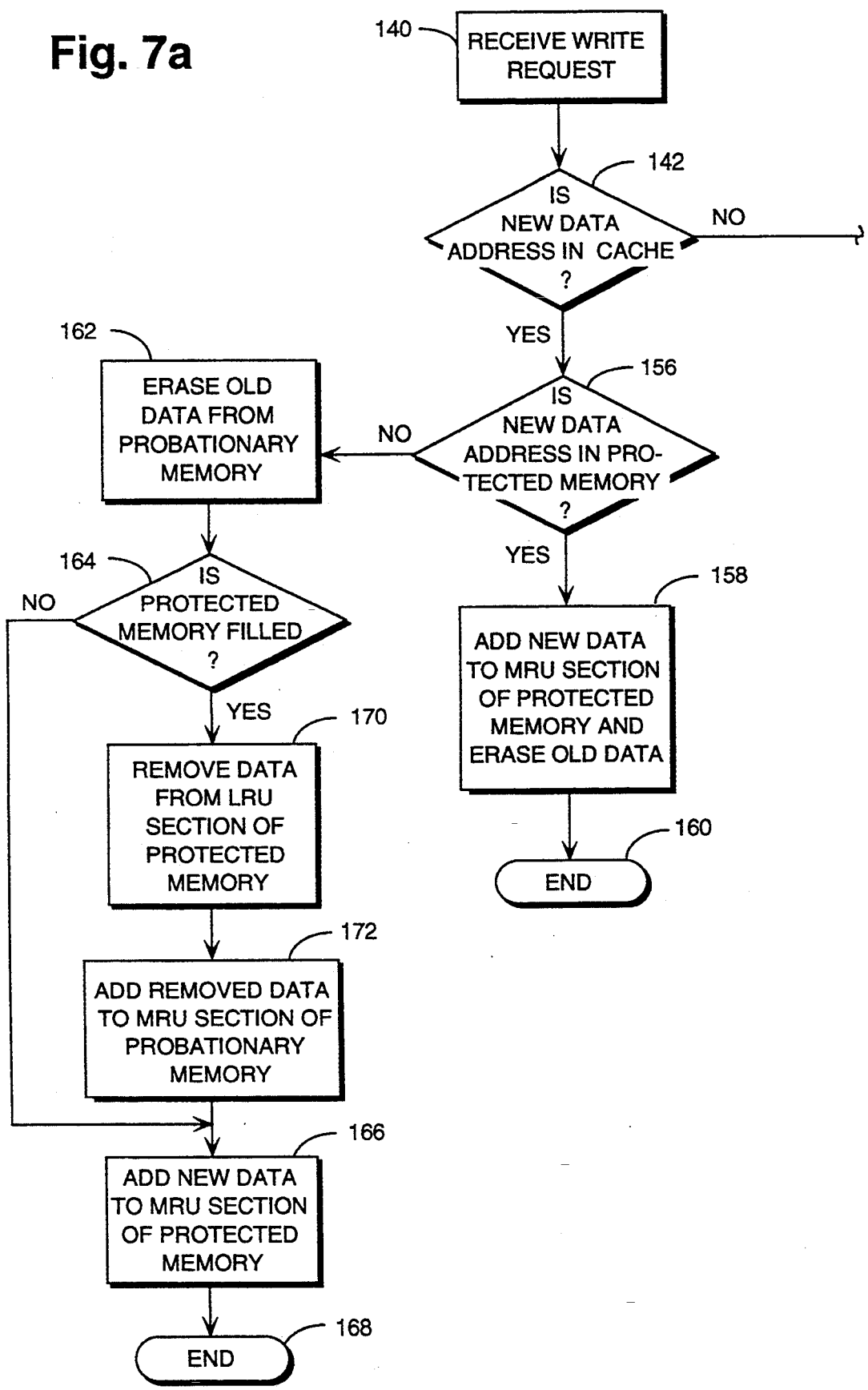

FIGS. 7a and 7b are flow charts for a write operation using a write-through cache. A write command is received at step 140. If the new data address is not in the cache as determined at step 142 then the mass storage device or disk is accessed at step 144. The new data is written into the appropriate disk address at step 146. Now, if the probationary memory of the cache is filled as determined at step 148 then data is discarded from the LRU section of the probationary memory at step 150 and new data from the disk is stored in the MRU section of the probationary memory at step 152 and the process ends at step 154. If the low priority or probationary memory is not filled as determined at step 148, then the new data from the disk is stored at the MRU section of the probationary memory 152 and the process ends at step 154.

If the new data address is in the cache as determined at step 142 and the new data address is in the protected memory as determined at step 156 then the new data is written to the MRU section of the protected memory and the old data is erased at step 158 and the process ends at step 160. If the new data is not in the protected memory as determined at step 156 then the old data is erased from the low priority memory at step 162. If the protected memory is not filled as determined at step 164 then the new data is written to the MRU section of the protected memory at step 166 and the process ends at step 168. If the high priority or protected memory is filled as determined at step 164 then data is removed from the LRU section of the protected memory at step 170 and added to the MRU section of the probationary memory at step 172 and the new data is written to the MRU section of the protected memory at step 166 and the process ends at step 168.

Figure 8A:
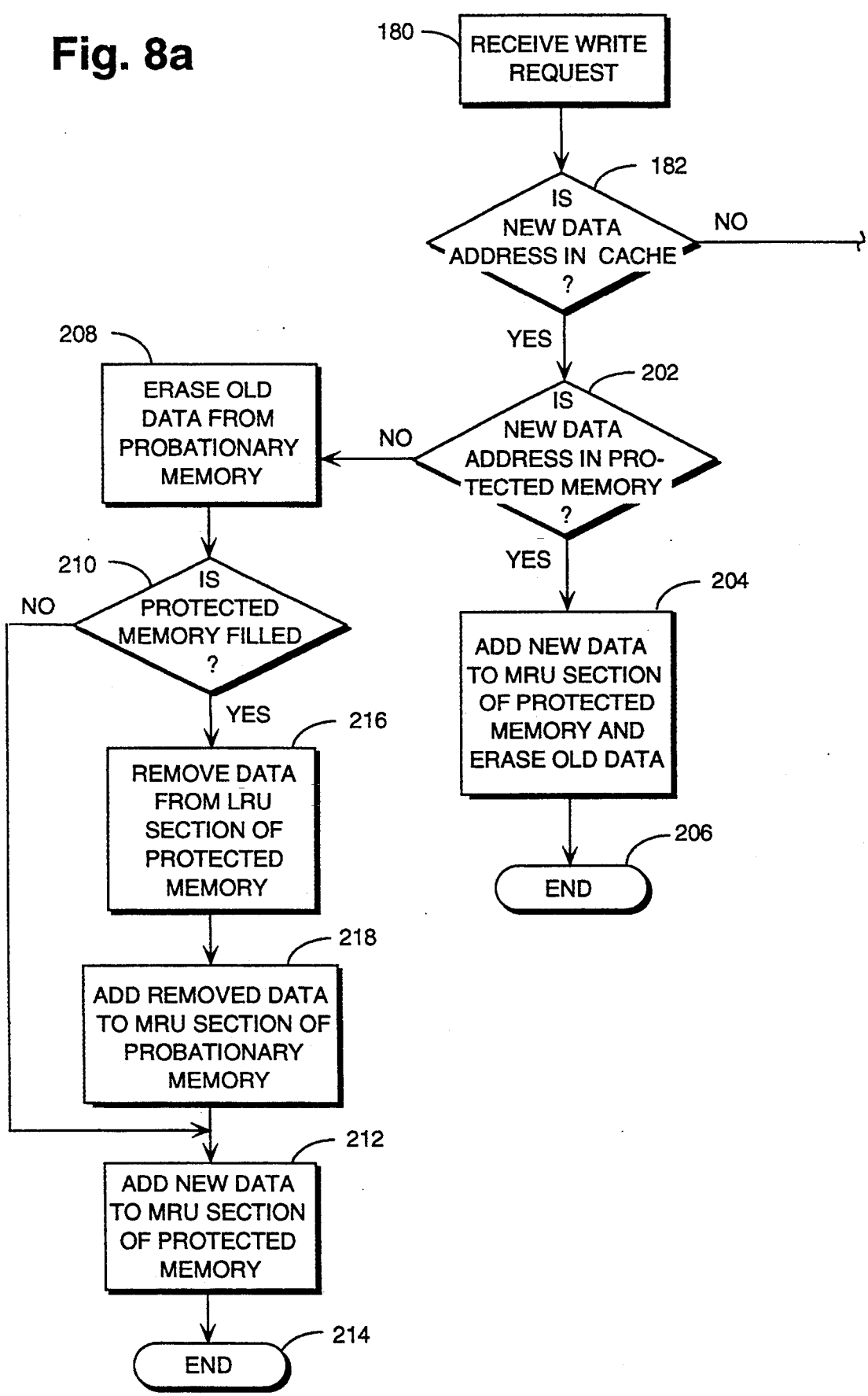
FIGS. 8a and 8b fare flow charts illustrating the cache management process for a write request and using a write-back cache.
Figure 8B:
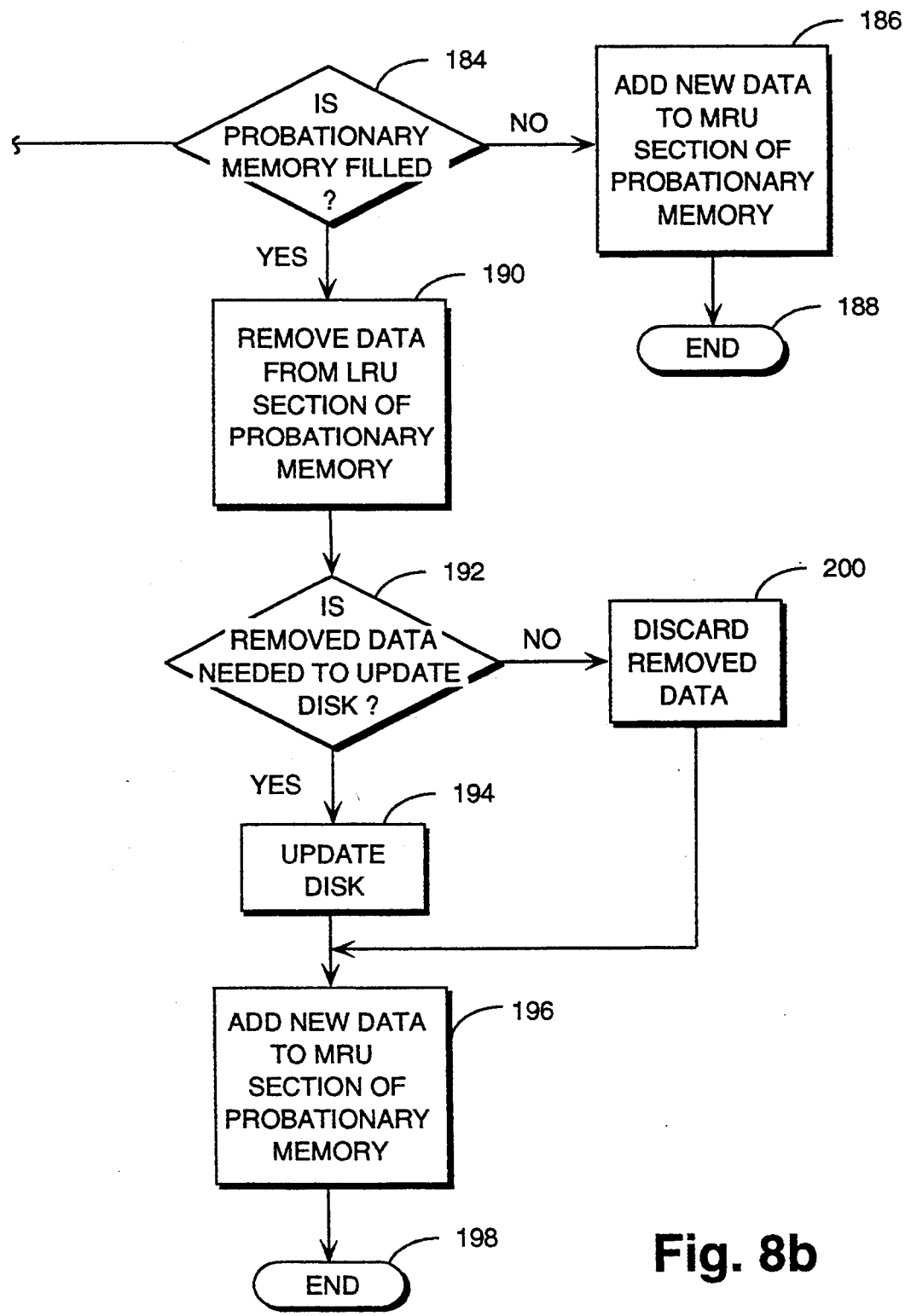

FIGS. 8a and 8b are flow charts of the write operation using a write-back cache. A write command is received at step 180. If the new data address is not in the cache as determined at step 182 the probationary memory is checked at step 184. If the low priority or probationary memory is not filled then the new data is written to the MRU section of the probationary memory at step 186 and the process ends at step 188. If the probationary memory is filed as determined at step 184 then data from the LRU section of the probationary memory is removed at step 190. If the removed data is needed to update the disk as determined at step 192 then the disk is updated at step 194 and the new data is written to the MRU section of the protected memory at step 196 and the process ends at step 198. If the removed data is not needed to update the disk as determined at step 192, the data is discarded at step 200 and the process proceeds to step 196.

If the new data address is in the cache as determined at step 182 and the new data address is in the priority memory as determined at step 202 then the new data is written to the MRU section of the protected memory and the old data is erased at step 204 and the process ends at step 206. If the new data address is not in the protected memory as determined at step 202 then the old data is erased from the probationary memory at step 208. If the high priority memory is not filled as determined at step 210, then the new data is written to the MRU section of the protected memory at step 2 12 and the process ends at step 214. If the protected memory is filled as determined at step 210 then data from the LRU section of the protected memory is removed at step 216 and added to the MRU section of the probationary memory at step 218. Next, the new data is written to the MRU section of the protected memory at step 212 and the process ends at step 214.

Figure 9:
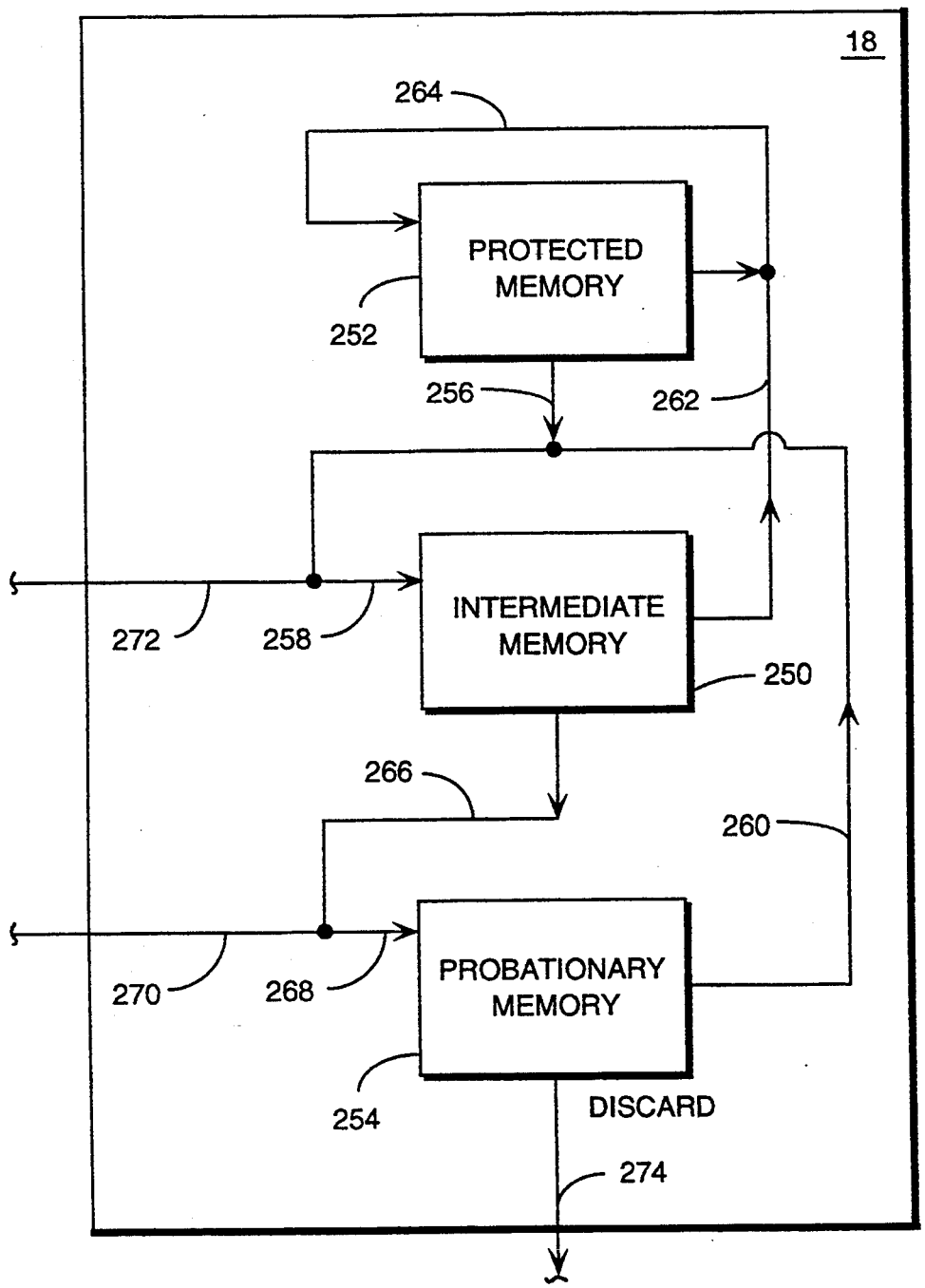
FIG. 9 is a block diagram of an alternative embodiment of the cache.

A cache with more than the protected region 60 and the probationary region 62 as described with reference to FIG. 4 may be used as well. FIG. 9 is a block diagram for an alternate embodiment of the present invention in which the cache 18 has an intermediate region or memory 250 as well as a protected region 252 and a probationary region 254. The protected region 252, intermediate region 250 and the probationary region 254 each sort stored data according to a LRU replacement algorithm. The protected region 252 removes and transfers via the line 256 least recently used data to a MRU input line 258 to the intermediate region 250.

Data selected from the sorted data in the probationary region 254 is fed to the MRU input line 258 to the intermediate region 250 via the line 260. Data selected from the sorted data in the intermediate region 250 is fed via select output line 262 to the MRU input of the protected region 252 via line 264, which also feeds data selected from the protected region 252 to the MRU input of the protected region 252 as described above. Least recently used data removed from the intermediate region 250 is fed to the most recently used input of the probationary region 254 via a line 266 coupled to the line 268.

New data from an associated MSD such as disk 30 is fed to the MRU input of the probationary region 254 on the line 270, or to the MRU input line 258 of the intermediate region 250 via a line 272, depending upon the desired prioritization of the new input data. For instance, new data coupled to the line 270 must pass only through the probationary region 254 without selection before being discarded on the line 274. New data received on the line 272 must pass through both the intermediate region 250 and the probationary region 254 without selection before being discarded on the line 274.

In the alternate embodiment of FIG. 9, data selected from either the protected region 252 or the intermediate region 250 re-sorts the data in protected region 252 to make the selected data the most recently used of the data in the protected region 252. Least recently used data removed from the protected region 252 as a result of data overflow in the protected region 252 is fed via lines 260 and 258 to the MRU input of the intermediate region 250. Data selected from the probationary region 254 is also fed via lines 260 and 258 to the MRU input of the intermediate region 250. Least recently used data removed from the intermediate region 250 as a result of data overflow in the intermediate region 250 is fed via lines 266 and 268 to the MRU input of the probationary 254. Data is finally discarded by the probationary region 254 via line 274 as a result of data overflow in the probationary region 254.

The protected region 252, intermediate region 250 and the probationary region 254 may have statically fixed or dynamically adjusted size ratios as described above for the preferred embodiment. They also may comprise different regions of a single memory. Further, there may be more than three regions which are connected in a sequential order as shown above, or in other configurations which are not sequential. Data can be segregated according to other criteria, such as separating read and write operations which pass through the cache. Applicant, for the sake of clarity in understanding the cache management operation, has not illustrated all of the inputs and outputs to the cache 18 as would be needed for use in a data storage system and as described with reference to FIGS. 1-4. The addition of the various input and output lines would be within the ability of those of ordinary skill in the field.

Figure 10:
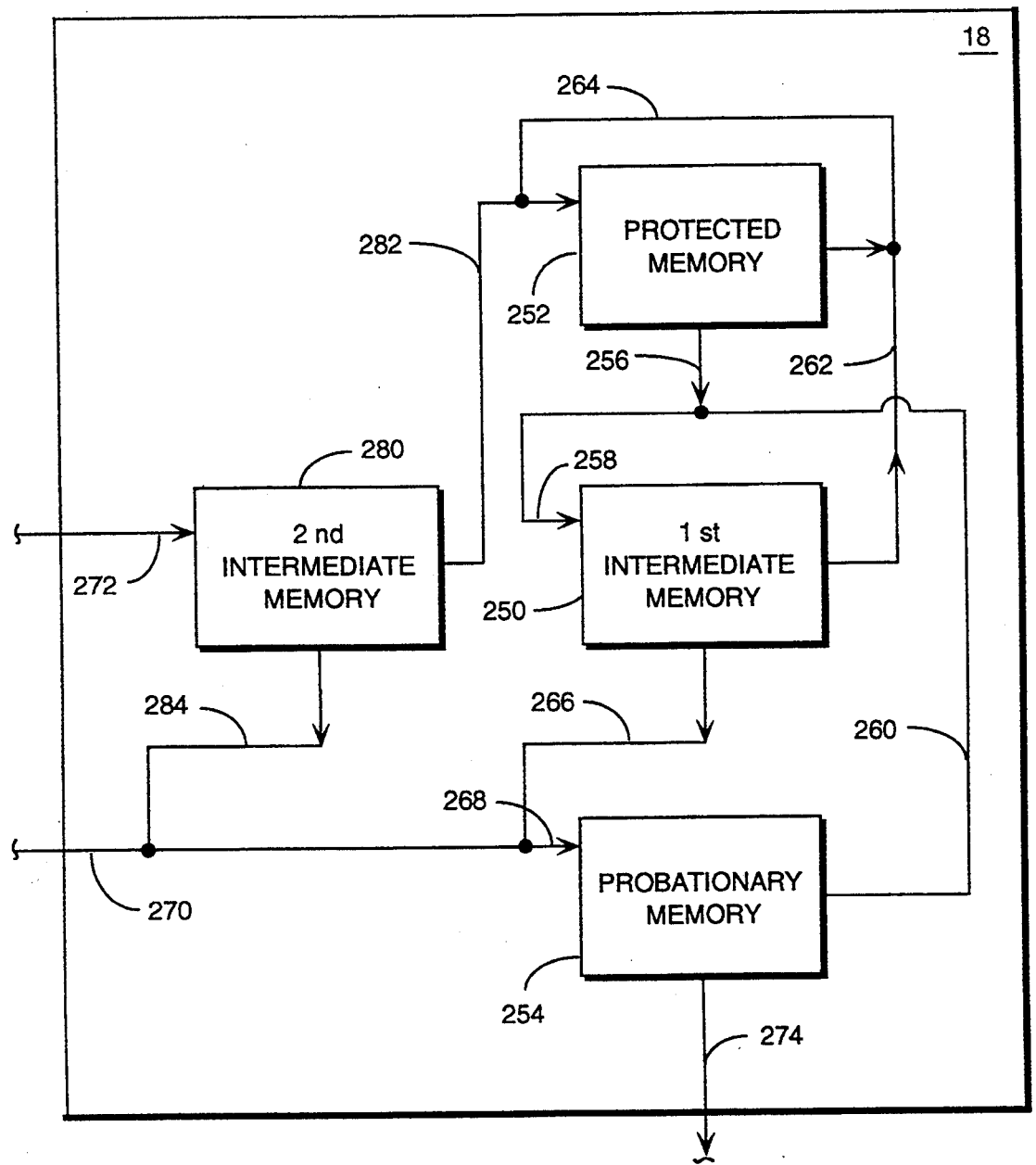
FIG. 10 is a block diagram of another alternative embodiment of the cache.

FIG. 10 shows still another embodiment of the present invention. In this embodiment the cache 18 separates the prioritization of read and write data. Read data not already in the cache is received on the line 270 and fed to the MRU input of the probationary region 254 via the line 268. The prioritization of the read data is the same as described above for the alternative embodiment in connection with FIG. 9. Write data for MSD locations not already in the cache is fed on the line 272 to the MRU input of a second intermediate region 280. Data selected from the second intermediate region 280 is fed from its select output on a line 282 to the MRU input of the protected region 252 via the line 264. Data removed from the second intermediate region 280 from overflow on a line 284 is fed to the MRU input of the probationary region 254 via the line 268.

In this way, the protected region 252 holds data requested three times or written and quickly requested before being removed from the second intermediate region 280. The first intermediate region 250 holds data selected twice along with data overflow from the protected region 252. The second intermediate region 280 holds newly written data. The probationary region 254 holds data selected once along with data overflow from the first intermediate region 250 and the second intermediate region 280. Applicant, for the sake of clarity in understanding the cache management operation, has not illustrated all of the, inputs and outputs to the cache 18 as would be needed for use in a data storage system and as described with reference to FIGS. 1-4. The addition of the various input and output lines would be within the ability of those of ordinary skill in the field.

Figure 11A:
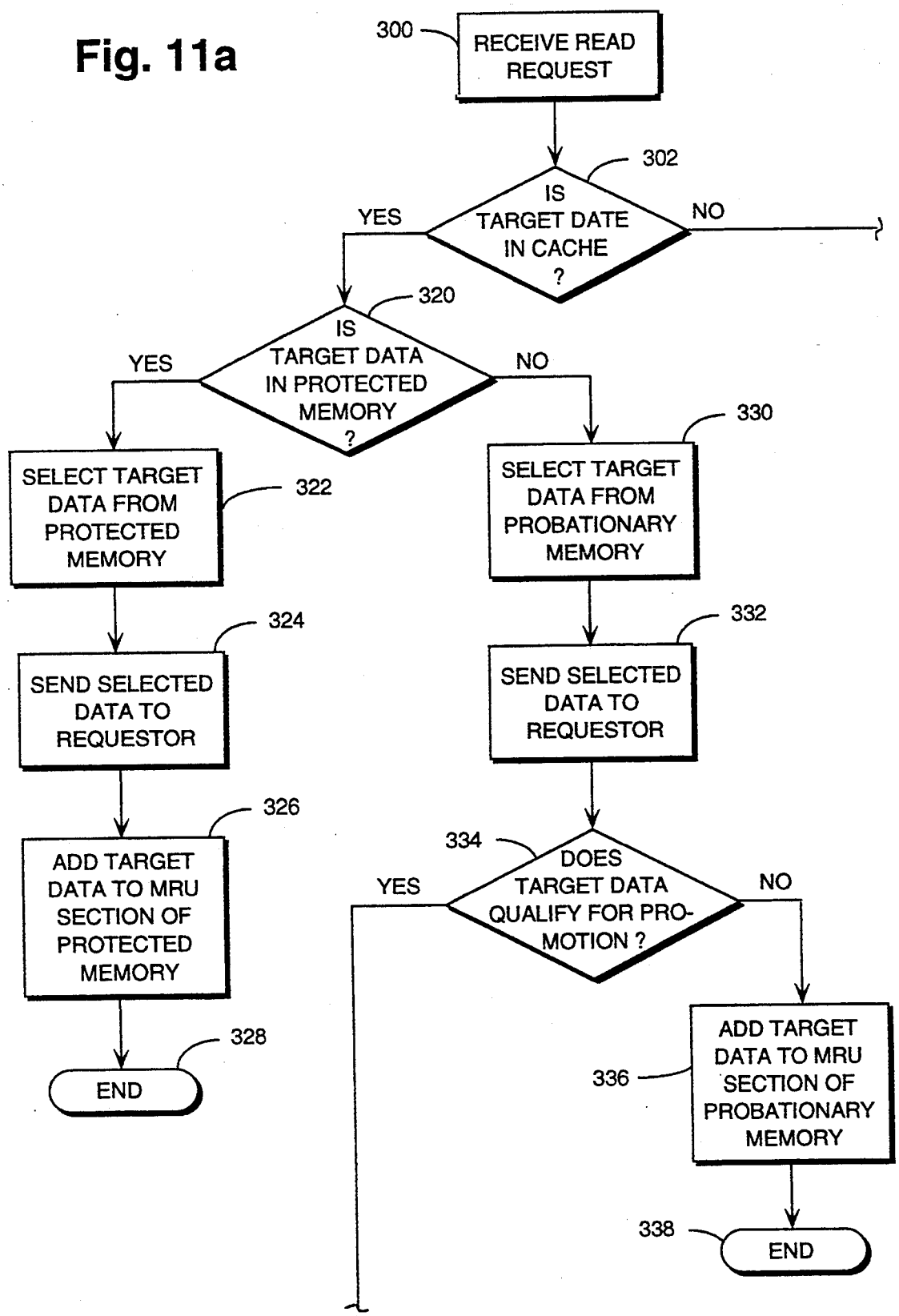
FIGS. 11a and 11b are flow charts illustrating the cache management process for a read request and using a write-back cache and a general promotion scheme.
Figure 11B:
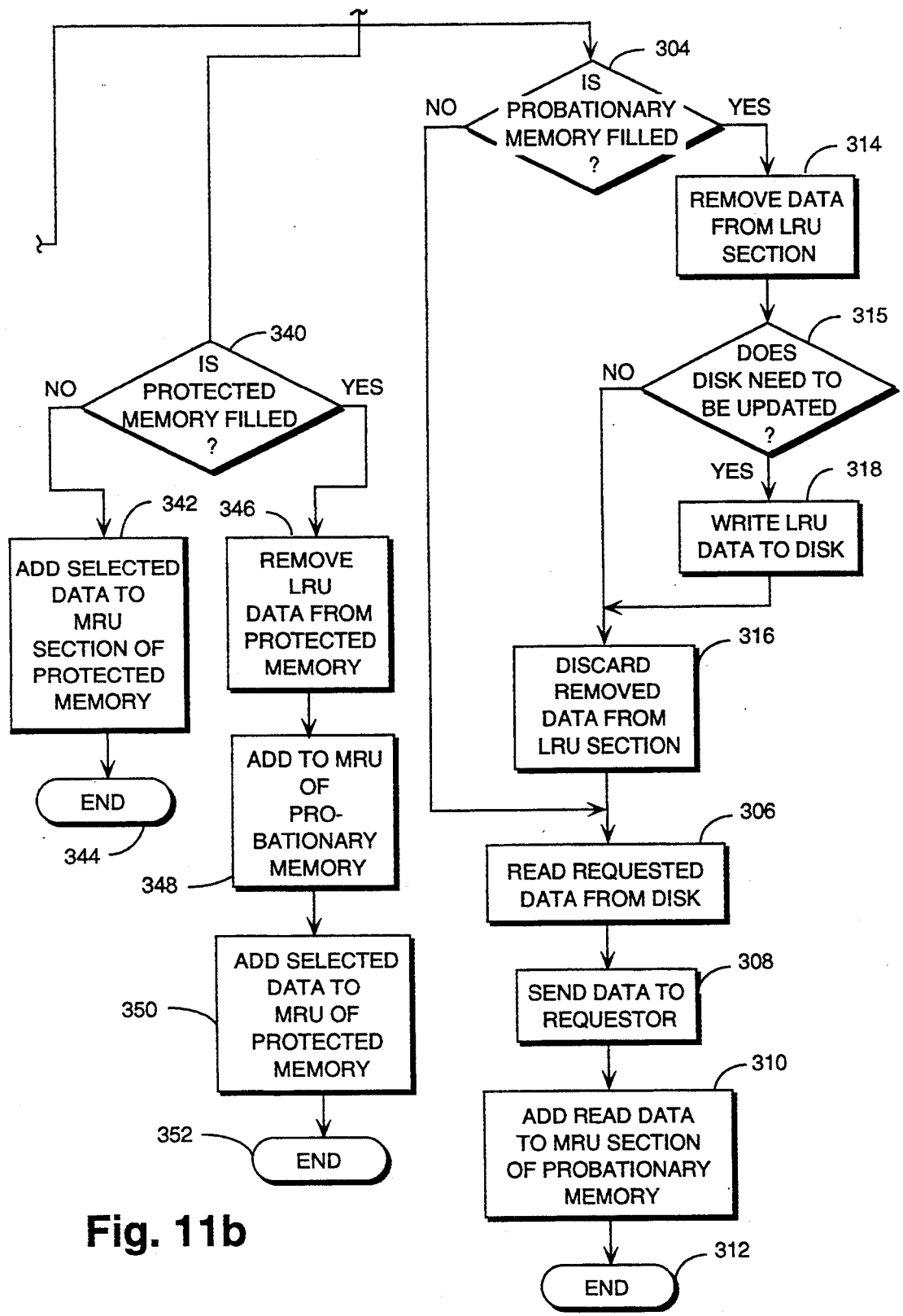

FIGS. 11a and 11b are flow charts illustrating a general promotion process of the cache management of the present invention. A read request is received at step 300. At step 302 it is determined if the target data is in the cache. If the target data is not in the cache, then at step 304 the status of the probationary memory or region is determined. If the probationary memory is not full, then at step 306 the target data is read from the mass storage device or disk. The read data is sent to the requestor at step 308 and added to the cache at step 310 and the process ends at step 312. If the probationary memory is full as determined at step 304, then at step 314 LRU data from the probationary memory is removed. Next, it is determined at step 315 whether the disk or mass storage device needs to be updated such as because the cache is a write-back cache. If the disk does not need to be updated, then at step 316 the LRU data from the probationary memory is discarded and the process continues with steps 306 through 312. If the disk does need to be updated, then at step 318 the LRU data from the probationary memory is written to the disk and the LRU data from the probationary memory is discarded at step 316 and the process continues at steps 306–312.

If the target data is in the cache as determined at step 302, then the location of the target data is determined at step 320. If the target data is in the protected memory, then at step 322 the target data is read from the protected memory. The target data is sent to the requestor at step 324 and transferred to the MRU input of the protected memory at step 326 and the process ends at step 328. If the target data is in the probationary memory as determined at step 320, then the target data is read from the probationary memory at step 330. The target data is also sent to the requestor at step 332. At step 334, it is determined if the target data qualifies for promotion. If the target data does not qualify for promotion then the target data is transferred to the MRU section of the probationary memory at step 336 and the process ends at step 338. If the target data qualifies for promotion at step 334, then at step 340 the status of the protected memory is determined. The step of qualifying for promotion can be any standard other than the accessing of the data a second time as set forth in the preferred embodiment. If the protected memory is not full, then the target data is transferred to the MRU section of the protected memory at step 342 and the process ends at step 344. If the protected memory is full as determined at step 340, then LRU data from the protected memory is removed at step 346. Next, the removed data is added to the MRU section of the probationary memory at step 348 and the selected or target data is added to the MRU section of the protected memory at step 350 and the process ends at step 352. The above is intended to be a general flow chart to show that other promotion schemes can be used with the present invention and various modifications would be needed to complete implementation of the cache management operation. For example, step 364 and 346 would not be needed if the cache was operating as a write-through as opposed to a write-back cache. These types of modifications are within the ability of those of ordinary skill in the field and are, accordingly, not described in detail.

Thus, there has been described herein cache management process for preventing flooding of a cache with long sequential references from an associated mass storage device with a replacement algorithm which approximates a LFU algorithm, while retaining the advantages of a LRU replacement algorithm. It will be understood that various changes in the details, arrangements and configuration of the parts and systems which have been described and illustrated above in order to explain the nature of the present invention may be made by those skilled in the art within the principle and scope of the present invention as expressed in the appended claims.

What is claimed is:

1. A method of improving effectiveness of a cache memory being used to store data requested from a mass storage device by a requestor, the cache memory having a probationary memory region and a protected memory region, both said probationary and protected memory regions respectively having a most recently used area and a least recently used area, comprising the steps of:

storing data requested from said mass storage device in said most recently used area of said probationary memory region;

discarding previously stored data from said least recently used area of said probationary memory region in response to said previous storing step when said probationary memory region is full;

receiving a read request for data stored in said probationary memory region;

sending said requested data to the requestor;

adding said requested data to said most recently used area of said protected memory region;

removing data from said least recently used area of said protected memory region if said protected memory region does not have room to receive said requested data then adding said requested data to said most recently used area of said protected memory region; and adding said removed data from said least recently used area of said protected memory region to said most recently used area of said probationary memory, region.

2. The method as set forth in claim 1, further comprising the steps of:

receiving a read request for data stored in said protected memory region;

sending said requested data to the requestor;

adding said requested data to said most recently used area of said protected memory region.

3. A method of improving effectiveness of a cache memory being used to store data requested from a mass storage device by a requestor, the cache memory having a probationary memory region and a protected memo region, both said probationary and protected memory regions respectively having a most recently used area and a least recently used area, comprising the steps of:

receiving a first read request for data not located in said cache memory;

retrieving said requested data from said mass storage device;

sending said requested data to said requestor;

adding said requested data to said most recently used area of said probationary memory region if said probationary memory region has room for said requested data;

removing data from said least recently used area of said probationary memory region if said probationary memory region does not have room for said requested data and then adding said requested data to said most recently used area of said probationary memory region;

receiving a second read request for data located in said probationary memory region;

sending said second requested data to said requestor;

adding said second requested data to said most recently used area of said protected memory region if said protected memory region has room for said second requested data;

removing data from said least recently used area of said protected memory region if said protected memory region does not have room to receive said second requested data then adding said second requested data to said most recently used area of said protected memory region; and adding said removed data from said least recently used area of said protected memory region to said most recently used area of said probationary memory region.

4. The method as set forth in claim 3, further comprising the steps of:

receiving a read request for data stored in said protected memory region;

sending said requested data to the requestor; and adding said requested data to said most recently used area of said protected memory region.

5. The method as set forth in claim 3 further comprising the steps of:

determining if said removed data from said least recently used area of said probationary memory region is needed to update said mass storage device;

updating said mass storage device with said removed data if needed; and discarding said removed data if updating said mass storage device is not needed.

6. A method of improving effectiveness of a cache memory being used to store data requested from a mass storage device by a requestor, the cache memory having a probationary memory region and a protected memory region, both said probationary and protected memory regions respectively having a most recently used area and a least recently used area, comprising the steps of:

receiving a write request for data stored in said probationary memory region;

erasing said stored data from said probationary memory region;

adding new data from said write request to said most recently used area of said protected memory region if said protected memory region has room to receive said new data;

removing data from said least recently used area of said protected memory region if said protected memory region does not have room to receive said new data then adding said new data to said most recently used area of said protected memory region; and adding said removed data from said least recently used area of said protected memory region to said most recently used area of said probationary memory region.

7. The method as set forth in claim 6, further comprising:

receiving a write request for data stored in said protected memory region;

erasing said stored data from said protected memory region; and adding said new data from said write request to said most frequently used area of said protected memory region.

8. A method of improving effectiveness of a cache memory being used to store data requested from a mass storage device by a requestor, the cache memory having a probationary memory region and a protected memory region, both said probationary and protected memory regions respectively having a most recently used area and a least recently used area, comprising the steps of:

receiving a write request for data not stored in said cache memory;

writing new data from said write request to said mass storage device;

adding said new data from said mass storage device to said most recently used area of said probationary memory region if said probationary memory region has room to receive said new data; and removing data from said least recently used area of said probationary memory region if said probationary memory region does not have room to receive said new data, then adding said new data to said most recently used area of said probationary memory region.

9. A method of improving effectiveness of a cache memory being used to store data requested from a mass storage device by a requestor, the cache memory having a probationary memory region and a protected memory region, both said probationary and protected memory regions respectively having a most recently used area and a least recently used area, comprising the steps of:

receiving a write request for data not stored in said cache memory;

adding new data from said write request to said most recently used area of said probationary memory region if said probationary memory region has room to receive said new data;

removing data from said least recently used area of said probationary memory region if said probationary memory region does not have room to receive said new data, then adding said new data to said most recently used area of said probationary memory region;

determining if said removed data from said least recently used area of said probationary memory region is needed to update said mass storage device;

updating said mass storage device with said removed data if needed; and, discarding said removed data if said updating of said mass storage device is not needed.

10. A method of improving effectiveness of a cache memory being used to store data requested from a mass storage device by a requestor, the cache memory having a probationary memory region and a protected memory region, both said probationary and protected memory regions respectively having a most recently used area and a least recently used area, comprising the steps of:

receiving a read request for data stored in said probationary memory region;

sending said requested data to said requestor;

determining if said requested data qualifies for promotion to said protected memory region;

adding said requested data to said most recently used area of said probationary memory region if said requested data does not qualify for promotion;

adding said requested data to said most frequently used area of said protected memory region if said requested data qualifies for promotion and said protected memory region has room for said requested data;

removing data from said least frequently used area of said protected memory region if said requested data qualifies for promotion and said protected memory region does not have room for said requested data, then adding said requested data to said most recently used area of said protected memory region; and adding said removed data from said least recently used area of said protected memory region to said most recently used area of said probationary memory region.

11. The method as set forth in claim 10, further comprising the steps of:

receiving a read request for data stored in said protected memory region;

sending said requested data to the requestor; and adding said requested data to said most recently used area of said protected memory region.

12. A method of improving effectiveness of a cache memory being used to store data requested from a mass storage device by a requestor, the cache memory having a probationary memory region and a protected memory region, both said probationary and protected memory regions respectively having a most recently used area and a least recently used area, comprising the steps of:

receiving a write request for data stored in said probationary memory region;

erasing said stored data from said probationary memory region;

determining if new data from aid writ request qualifies for promotion to said protected memory region;

adding said new data to said most recently used area of said probationary memory region if said new data does not qualify for promotion;

adding said new data to said most frequently used area of said protected memory region if said new data qualifies for promotion;

removing data from said least frequently used area of said protected memory region if said new data qualifies for promotion and said protected memory region does not have room for said new data, then adding said requested data to said most recently used area of said protected memory region; and adding said removed data from said least recently used area of said protected memory region to said most recently used area of said probationary area.

13. A method of improving effectiveness of a cache memory being used to store requested data from a mass storage device by a requestor, said cache memory having a protected memory region, an intermediate memory region and a probationary memory region, each of the protected, intermediate and probationary memory regions respectively having a most recently used area and a least recently used area, comprising the steps of:

storing data requested from said mass storage device in said most recently used area of said probationary memory region;

discarding previously stored data from said least recently used area of the said probationary memory region in response to said storing step when said probationary memory region is full;

requesting data from said probationary memory region and storing said data in said most recently used area of said intermediate memory region;

transferring previously stored data from said least recently used area of said intermediate memory region in response to said step of storing said data when the intermediate memory region is full and storing said previously stored data from said least recently used area of said intermediate memory region in said most recently used area of said probationary memory region;

requesting data from said intermediate memory region and storing said requested data as requested at least twice in said most recently used area of said protected memory region;

removing previously stored data from said least recently used area of said protected memory region in response to said step of storing data when the protected memory region is full and storing said previously stored data from the least recently used area of the protected memory region in the most recently used area of the intermediate memory region and transferring previously stored data from the least recently used area of the intermediate memory region in response to said step of storing the previously stored data from the protected memory region when the intermediate memory region is full and storing said previously stored data from said intermediate memory region in the most recently used area of the probationary memory region; and, selecting data as data requested from the protected memory region and storing said data in the most recently used area of the protected memory region.

14. A method of improving effectiveness of a cache memory being used to store selected data from a mass storage device, said cache memory having a low priority memory region, an intermediate priority memory region and a high priority memory region, each of the low, intermediate and high priority memory regions respectively having a most recently used area and a least recently used area, comprising the steps of:

storing data selected from the mass storage device in the most recently used area of the intermediate priority memory region;

transferring previously stored data from the least recently used area of the intermediate priority memory region in response to said step of storing when the intermediate priority memory region is full and storing said previously stored data from the intermediate priority memory region in the most recently used area of the low priority memory region;

discarding data from the least recently used area of the low priority memory location in response to said step of storing when the low priority memory region is full;

selecting data from the low priority memory region and storing said data in the most recently used area of the intermediate memory region;

transferring previously stored data from the least recently used area of the intermediate priority memory region in response to said step of storing data when the intermediate priority memory region is full and storing said previously stored data from the least recently used area of the intermediate priority memory region in the most recently used area of the low priority memory region;

selecting data from the intermediate priority memory region and storing said data in the most recently used area of the high priority memory region;

transferring previously stored data from the least recently used area of the high priority memory region in response to said step of storing data when the high priority memory region is full and storing said previously stored data from the least recently used area of the high priority memory region in the most recently used area of the intermediate priority memory region and transferring previously stored data from the least recently used area of the intermediate memory region in response to said step of storing the previously stored data from the high priority memory region when the intermediate priority memory region is full and storing said previously stored data from said intermediate priority memory region in the most frequently used area of the low priority memory region; and selecting data from the high priority memory region and storing said data in the most recently used area of the high priority memory region.

* * * * *